US011266978B2

(12) United States Patent
Nakai (10) Patent No.: US 11,266,978 B2
(45) Date of Patent: Mar. 8, 2022

(54) METHOD FOR PREPARING DISPERSION OF METAL-CONTAINING PARTICLES AND METHOD FOR PRODUCING HYDROGENATED CONJUGATED DIENE POLYMER

(71) Applicant: ZEON CORPORATION, Tokyo (JP)

(72) Inventor: Akito Nakai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 55 days.

(21) Appl. No.: 16/087,723

(22) PCT Filed: Mar. 28, 2017

(86) PCT No.: PCT/JP2017/012715
§ 371 (c)(1),
(2) Date: Sep. 24, 2018

(87) PCT Pub. No.: WO2017/170584
PCT Pub. Date: Oct. 5, 2017

(65) Prior Publication Data
US 2019/0076824 A1    Mar. 14, 2019

(30) Foreign Application Priority Data

Mar. 31, 2016 (JP) .............................. JP2016-072665
Aug. 25, 2016 (JP) .............................. JP2016-164713

(51) Int. Cl.
*B01J 23/44* (2006.01)
*C08F 36/04* (2006.01)
(Continued)

(52) U.S. Cl.
CPC ............... *B01J 23/44* (2013.01); *B01J 35/02* (2013.01); *B01J 35/026* (2013.01);
(Continued)

(58) Field of Classification Search
CPC . B01J 23/44; B01J 35/02; B01J 35/026; B01J 37/0219; B01J 37/0225; C06F 8/04; C06F 36/04
See application file for complete search history.

(56) References Cited

U.S. PATENT DOCUMENTS

| 4,452,951 A | 6/1984 | Kubo et al. |
| 6,376,622 B1 | 4/2002 | Hucul |
| (Continued) | | |

FOREIGN PATENT DOCUMENTS

| CN | 1409730 A | 4/2003 |
| CN | 101003011 A | 7/2007 |
| (Continued) | | |

OTHER PUBLICATIONS

Oct. 2, 2018 International Preliminary Report on Patentability issued in International Patent Application No. PCT/JP2017/012715.
(Continued)

*Primary Examiner* — Colin W. Slifka
*Assistant Examiner* — Michael Forrest
(74) *Attorney, Agent, or Firm* — Oliff PLC (57) ABSTRACT

A method for producing a dispersion of metal-containing particles includes contacting a metal-supported material obtained by supporting a metal and/or a metal compound on a carrier with a polymeric protective agent showing affinity for the metal and/or the metal compound in a solvent to obtain a dispersion of metal-containing particles in which the metal and/or the metal compound is dispersed in the solvent in the form of particles.

5 Claims, 1 Drawing Sheet

(A)

(B)

(51) Int. Cl.
  *B01J 35/02* (2006.01)
  *C08F 8/04* (2006.01)
  *B01J 37/02* (2006.01)

(52) U.S. Cl.
  CPC ....... *B01J 37/0219* (2013.01); *B01J 37/0225* (2013.01); *C08F 8/04* (2013.01); *C08F 36/04* (2013.01)

(56) References Cited

U.S. PATENT DOCUMENTS 6,984,668 B1 * 1/2006 Eastham ............ B01J 35/0013
  516/31
2008/0269533 A1 * 10/2008 Chang .................... C10G 45/40
  585/277

FOREIGN PATENT DOCUMENTS

| CN | 101954278 | A | * | 1/2011 | ............ B01J 23/44 |
|---|---|---|---|---|---|
| CN | 101954278 | A | | 1/2011 | |
| JP | S57-205404 | A | | 12/1982 | |
| JP | 58005304 | A | * | 1/1983 | ............ C08F 8/04 |
| JP | S58-17103 | A | | 2/1983 | |
| JP | 2007-229641 | A | | 9/2007 | |

OTHER PUBLICATIONS

Oct. 30, 2019 Search Report issued in European Patent Application No. 17775122.9.
Nov. 5, 2019 Search Report issued in European Patent Application No. 17775121.1.
Database WPI. Week 198209 Thomson Scientific, London, GB; AN 1982-17118E. XP002795021,—& NL 8 003 898 A (Nederland Org TNO) Feb. 1, 1982.
Database WPI. Week 201132 Thomson Scientific, London, GB; AN 2011-D02592. XP002795022,—& CN 101 954 278 A (Chenzhou Gaoxin Platinum Co Ltd) Jan. 26, 2011.
May 30, 2017 International Search Report issued in International Patent Application No. PCT/JP2017/012715.
May 30, 2017 International Search Report issued in International Patent Application No. PCT/JP2017/012716.
U.S. Appl. No. 16/087,710, filed Sep. 24, 2018 in the name of Yoshiki Fujimura et al.
Dec. 7, 2020 Restriction Requirement issued in U.S. Appl. No. 16/087,710.
Jun. 11, 2021 Office Action issued in U.S. Appl. No. 16/087,710.

* cited by examiner

METHOD FOR PREPARING DISPERSION OF METAL-CONTAINING PARTICLES AND METHOD FOR PRODUCING HYDROGENATED CONJUGATED DIENE POLYMER

TECHNICAL FIELD

The present invention relates to a method for producing a dispersion of metal-containing particles, the dispersion having excellent catalytic activity as a hydrogenation reaction catalyst, and a method for producing a hydrogenated, conjugated diene-based polymer using such a dispersion of metal-containing particles.

BACKGROUND ART

In chemical industry for producing pharmaco- and agrochemicals, petrochemicals, polymers, and the like, hydrogenation reactions are widely carried out in which carbon-carbon unsaturated bonds and carbon-nitrogen unsaturated bonds contained in various compounds are hydrogenated for conversion to the corresponding saturated bonds.

For example, in the field of polymer production, a method for selectively or partially hydrogenating carbon-carbon double bonds of conjugated diene-based polymers is known as a useful means for reforming the conjugated diene-based polymers, and hydrogenated, conjugated diene-based polymers such as hydrogenated acrylonitrile-butadiene copolymers are produced on an industrial scale.

Such a hydrogenated, conjugated diene-based polymer is usually produced by hydrogenating in a solvent a conjugated diene-based polymer obtained by polymerizing a conjugated-diene-containing monomer using a metal-containing catalyst such as a platinum group element.

Examples of the metal-containing catalyst used in the above process include metal elements and compounds of metal elements, and such metal elements and compounds of metal elements are, for example, used as metal-supported catalysts by being supported on carriers (see, for example, Patent Document 1).

RELATED ART

Patent Document

Patent Document 1: Japanese Patent Laid-Open No. 58-17103

SUMMARY OF THE INVENTION

Problem to be Solved by the Invention

Meanwhile, a high hydrogenation ratio is required in the hydrogenation reaction of such a conjugated diene-based polymer, and accordingly a hydrogenation catalyst is also required to enable a high hydrogenation ratio to be achieved even when used in a small amount.

The present invention was made in view of such a circumstance, and an object is to provide a method for producing a dispersion of metal-containing particles, the dispersion having excellent catalytic activity as a hydrogenation reaction catalyst and enabling a high hydrogenation ratio to be achieved, and a method for producing a hydrogenated, conjugated diene-based polymer using such a dispersion of metal-containing particles.

Means for Solving the Problem

Having conducted diligent research to solve the above problem, the inventors have found that contacting a metal-supported material obtained by supporting a metal and/or a metal compound on a carrier with a polymeric protective agent showing affinity for the metal and/or the metal compound in a solvent makes it possible to obtain a dispersion of metal-containing particles in which the metal and/or the metal compound is dispersed in the foam of particles in the solvent and that such a dispersion of metal-containing particles has excellent catalytic activity as a hydrogenation reaction catalyst and enables a high hydrogenation ratio to be achieved, and completed the present invention.

That is, the present invention provides a method for producing a dispersion of metal-containing particles, comprising contacting a metal-supported material obtained by supporting a metal and/or a metal compound on a carrier with a polymeric protective agent showing affinity for the metal and/or the metal compound in a solvent to obtain a dispersion of metal-containing particles in which the metal and/or the metal compound is dispersed in the solvent in the form of particles.

In the present invention, the metal-supported material is preferably obtained by supporting a platinum group element and/or a platinum group element-containing compound as the metal and/or the metal compound on a carrier.

In the present invention, the polymeric protective agent is preferably a polymer of a vinyl compound having a polar group on a side chain.

In the present invention, the polymeric protective agent is preferably polyvinylpyrrolidone.

In the present invention, it is preferable that a ratio of the metal-supported material to the polymeric protective agent be preferably 0.1 to 1,000 in terms of a weight ratio of "the polymeric protective agent/the sum of the metal and the metal compound in the metal-supported material".

Also, the present invention provides a method for producing a hydrogenated, conjugated diene-based polymer, comprising hydrogenating a conjugated diene-based polymer in a solvent in the presence of a dispersion of metal-containing particles obtained by the above production method.

Effects of Invention

The present invention can provide a dispersion of metal-containing particles, the dispersion having excellent catalytic activity as a hydrogenation reaction catalyst and enabling a high hydrogenation ratio to be achieved. Also, the present invention can provide a method for producing a hydrogenated, conjugated diene-based polymer using such a dispersion of metal-containing particles.

DESCRIPTION OF EMBODIMENTS

Method for Producing Dispersion of Metal-Containing Particles

The method for producing a dispersion of metal-containing particles of the present invention comprises contacting a metal-supported material obtained by supporting a metal and/or a metal compound on a carrier with a polymeric protective agent showing affinity for the metal and/or the metal compound in a solvent to obtain a dispersion of metal-containing particles in which the metal and/or the metal compound is dispersed in the solvent in the foam of particles.

The metal-supported material used in the production method of the present invention is obtained by supporting the metal and/or the metal compound on a carrier.

The metal and/or the metal compound constituting the metal-supported material may be a metal or a metal compound used as a catalyst of a hydrogenation reaction of carbon-carbon unsaturated bonds or the like contained in various compounds including conjugated diene-based polymers, and is not particularly limited. From the viewpoint of catalytic activity, platinum group elements and/or platinum group element-containing compounds, i.e., ruthenium, rhodium, palladium, osmium, iridium or platinum, or compounds containing them, are preferably used. Among these, palladium, rhodium, or compounds thereof are preferable, and palladium or a palladium compound is more preferable. Although two or more platinum group elements and platinum group element-containing compounds may be used in combination, also in such a case palladium or a palladium compound is preferably a main catalyst component.

As the palladium compound, usually a divalent or tetravalent palladium compound is used, and is in the form of a salt or a complex salt.

Examples of the palladium compound include palladium acetate, palladium cyanide, palladium fluoride, palladium chloride, palladium bromide, palladium iodide, palladium nitrate, palladium sulfate, palladium oxide, palladium hydroxide, dichloro(cyclooctadiene) palladium, dichloro (norbomadiene) palladium, dichlorobis(triphenyl phosphine) palladium, sodium tetrachloropalladate, ammonium hexachloropalladate, potassium tetracyanopalladate, and the like.

Among these palladium compounds, palladium acetate, palladium nitrate, palladium sulfate, palladium chloride, sodium tetrachloropalladate, and ammonium hexachloropalladate are preferable, and palladium acetate, palladium nitrate, and palladium chloride are more preferable.

Examples of the rhodium compound include rhodium chloride, rhodium bromide, rhodium iodide, rhodium nitrate, rhodium sulfate, rhodium acetate, rhodium formate, rhodium propionate, rhodium butyrate, rhodium valerate, rhodium naphthenate, rhodium acetylacetonate, rhodium oxide, rhodium trihydroxide, and the like.

The carrier for forming the metal-supported material may be a carrier commonly used as a carrier of a metal catalyst, and, specifically, activated carbon commonly used as an adsorbent, and inorganic compounds containing silicon, aluminum, magnesium, and the like are preferable.

It is preferable to suitably select such a carrier from known catalyst carriers such as carbon such as activated carbon, activated clay, talc, clay, alumina gel, silica, diatomaceous earth, and synthetic zeolite. Examples of the method for supporting a metal or a metal compound as a catalyst component on a carrier include an impregnation method, a coating method, a spraying method, a precipitation method, and the like. The amount of the metal or the metal compound supported is preferably 0.1 to 20 wt %, more preferably 0.1 to 10 wt %, and further preferably 0.1 to 5 wt % in terms of the ratio of the metal or the metal compound to the total amount of the metal or the metal compound as a catalyst component and the carrier.

The polymeric protective agent used in the production method of the present invention is a polymeric material showing affinity for the metal and/or the metal compound supported on the metal-supported material, and interacts with the metal and/or the metal compound supported on the metal-supported material to thus allow the metal and/or the metal compound to be dispersed in a solvent in the form of particles that are in a protected state. Such a polymeric protective agent is not particularly limited, and from the viewpoint of affinity for the metal and/or the metal compound supported on the metal-supported material, polymers having a polar group are preferable, in particular, polymers having at least one polar group selected from the group consisting of an alkoxyl group, a carbonyl group, a hydroxyl group, a carboxyl group, an ether group, an amino group, and a cyano group are more preferable, and polymers having at least one polar group selected from the group consisting of an alkoxyl group, a carbonyl group, an ether group, and a cyano group are more preferable. Specific examples of such polymeric protective agents include polymers of vinyl compounds having a polar group on a side chain, such as polyvinylpyrrolidone, polyvinyl alcohol, polyvinyl acetal, and polymethyl vinyl ether; metal salts of polyacrylic acid, such as sodium polyacrylate and potassium polyacrylate; polyethers such as polyethylene glycol, polypropylene oxide, ethylene oxide-propylene oxide copolymers; cellulose derivatives such as carboxymethyl cellulose and hydroxypropyl cellulose; natural polymers such as gelatin and albumin; nitrogen atom-containing polymers such as polyethyleneimine and acrylonitrile-butadiene copolymers; and the like. Among these, from the viewpoint of affinity for the metal and/or the metal compound supported on the metal-supported material, polyvinylpyrrolidone, polymethyl vinyl ether, and polyethylene glycol are preferable, and polyvinylpyrrolidone is more preferable. In the case of using the dispersion of metal compound particles obtained by the production method of the present invention as a hydrogenation catalyst for an acrylonitrile-butadiene copolymer serving as an example of the conjugated diene-based polymer, it is also suitable to use an acrylonitrile-butadiene copolymer as a polymeric protective agent from the viewpoint of enabling the interaction with the target polymer of a hydrogenation reaction to be further enhanced. One polymeric protective agent may be used alone, or two or more may be used in combination.

The weight average molecular weight of the polymeric protective agent used in the production method of the present invention is preferably 500 to 1,000,000, and more preferably 1,000 to 500,000. Configuring the weight average molecular weight to be in the above range enables particles of the metal and/or particles of the metal compound (i.e., metal-containing particles) to be more appropriately protected when dispersing the metal and/or the metal compound in the form of particles in a solvent, thereby making it possible to further improve the dispersibility of the metal-containing particles in a solvent and catalytic activity as a hydrogenation catalyst. The weight average molecular weight of the polymeric protective agent can be determined as, for example, a value in terms of polystyrene using gel permeation chromatography (GPC).

In the production method of the present invention, the polymeric protective agent is contacted with the metal-supported material in a solvent. The solvent used at this time is not particularly limited, and a solvent capable of dissolving the polymeric protective agent is preferable, and from the viewpoint of having good affinity for the polymeric protective agent and thereby enabling the dispersibility of the metal-containing particles to be further enhanced, a solvent having a solubility parameter in the range of 6.6 to 24.0 $(cal/cm^3)^{1/2}$ is more preferable, and a solvent having a solubility parameter in the range of 7.0 to 23.5 $(cal/cm^3)^{1/2}$ is particularly preferable. Examples of such a solvent include water, methanol, ethanol, isopropyl alcohol, acetone, methyl ethyl ketone, diethyl ketone, methyl isopropyl ketone, 2-pentanone, 3-pentanone, cyclopentanone, cyclohexanone, diethyl ether, tetrahydrofuran, dioxane, anisole, and the like. When selecting a solvent in the production method of the present invention, the solvent may be selected from the viewpoint of affinity for a solvent used when subjecting a conjugated diene-based polymer to a hydrogenation reaction, and, for example, it is preferable to select a solvent having great affinity for a solvent used in the hydrogenation reaction or the same solvent as the solvent used in the hydrogenation reaction. For example, when the solvent used in the hydrogenation reaction is water (i.e., in the case of a water dispersion of a conjugated diene-based polymer), water or a solvent having great affinity for water, such as methanol, ethanol, isopropyl alcohol, or acetone, can be selected as a solvent used when contacting the polymeric protective agent with the metal-supported material. Alternatively, when the solvent used in the hydrogenation reaction is an organic solvent such as methanol, ethanol, isopropyl alcohol, or acetone, the same solvents as these may be selected as solvents for use when contacting the polymeric protective agent with the metal-supported material.

Then, in the production method of the present invention, the polymeric protective agent is contacted with the above-described metal-supported material in a solvent, and thereby a dispersion of metal-containing particles is obtained in which the metal and/or the metal compound contained in the metal-supported material is dispersed in the solvent in the form of particles. The method for contacting the polymeric protective agent with the metal-supported material in a solvent is not particularly limited, and examples include a method involving stirring the metal-supported material and the polymeric protective agent in a solvent, and the like.

When contacting the polymeric protective agent with the metal-supported material in a solvent, the amount of the metal-supported material and the polymeric protective agent is preferably 0.1 to 1,000, more preferably 0.2 to 900, and further preferably 0.5 to 800 in terms of the weight ratio of "the polymeric protective agent/the sum of the metal and the metal compound in the metal-supported material". Configuring the amount thereof used to be in the above range enables the dispersibility of the obtained dispersion of metal-containing particles to be more stable, thereby making it possible to further enhance catalytic activity as a hydrogenation catalyst.

The atmosphere when contacting the polymeric protective agent with the metal-supported material in a solvent is not particularly limited, and from the viewpoint of enabling a larger amount of the metal and/or the metal compound supported on the surface of the metal-supported material to be dispersed in the solvent, a reducing atmosphere such as a hydrogen gas atmosphere is preferable. At this time, the pressure (the gauge pressure) of hydrogen is preferably 0 to 5 MPa, more preferably 0.01 to 3 MPa, and even more preferably 0.1 to 2 MPa. Also, instead of a method involving a reducing atmosphere, a method involving adding a reducing agent such as sodium borohydride ($NaBH_4$) to the system may be employed.

In the case of employing a method involving stirring the metal-supported material and the polymeric protective agent, the stirring rate is not particularly limited, and is preferably 1 to 100 rpm and more preferably 5 to 40 rpm, and the stirring time is preferably 5 to 600 minutes and more preferably 10 to 120 minutes. The stirring temperature is preferably 0 to 80° C. and more preferably 5 to 50° C.

Then, in the production method of the present invention, the polymeric protective agent is contacted with the metal-supported material in a solvent, thereby making it possible to obtain a dispersion of metal-containing particles in which the metal and/or the metal compound contained in the metal-supported material is dispersed in the form of particles in the solvent. If necessary, the dispersion of metal-containing particles thus obtained may be subjected to filtration or the like to remove the metal-supported material.

In the dispersion of metal-containing particles thus obtained, the metal and/or the metal compound contained in the metal-supported material is dispersed in the form of particles that are in the state of being protected by the polymeric protective agent (in the state of being in interaction with the polymeric protective agent), and the metal-containing particles contained in the dispersion are usually dispersed as particles having a size in the order of nanometers (specifically, in the order of several nanometers to several tens of nanometers). Other than being in the foam of a metal and/or a metal compound contained in a metal-supported material, such metal-containing particles may be those dispersed in an ionized state. In particular, in the production method of the present invention, a metal-supported material obtained by supporting a metal and/or a metal compound on a carrier is used as a raw material, and in the metal-supported material, the metal and/or the metal compound is usually supported in the form of particles having a size in the order of nanometers. Then, according to the production method of the present invention, a polymeric protective agent is contacted with such a metal-supported material, and thus the metal and/or the metal compound can be dispersed in a solvent while appropriately maintaining the state of particles having a size in the order of nanometers due to the action of the polymeric protective agent, and thereby high catalytic activity can be achieved.

Method for Producing Hydrogenated, Conjugated Diene-Based Polymer

The method for producing a hydrogenated, conjugated diene-based polymer of the present invention comprises hydrogenating a conjugated diene-based polymer in a solvent in the presence of a dispersion of metal-containing particles obtained by the production method described above.

In the present invention, hydrogenation is a reaction in which at least some of the carbon-carbon double bonds contained in a conjugated diene-based polymer are hydrogenated to be converted into saturated bonds. The conjugated diene-based polymer used in the present invention is a polymer produced by a conventionally known emulsion polymerization method or solution polymerization method, preferably an emulsion polymerization method, using a conjugated diene monomer alone or a conjugated diene monomer in combination with a monomer that is copolymerizable with the conjugated diene monomer.

The conjugated diene monomer for foaming a conjugated diene-based polymer is not particularly limited as long as it is a polymerizable monomer having a conjugated diene structure, and examples include 1,3-butadiene, 2-methyl-1,3-butadiene (isoprene), 2,3-dimethyl-1,3-butadiene, 2-chloro-1,3-butadiene, 1,3-pentadiene, and the like. Among these, 1,3-butadiene and 2-methyl-1,3-butadiene are preferable, and 1,3-butadiene is more preferable.

Examples of the monomer copolymerizable with a conjugated diene monomer include $\alpha,\beta$-ethylenically unsaturated nitrile monomers such as acrylonitrile, methacrylonitrile, and crotononitrile; $\alpha,\beta$-ethylenically unsaturated carboxylic acids such as acrylic acid, methacrylic acid, crotonic acid, fumaric acid, maleic acid, and itaconic acid; $\alpha,\beta$-ethylenically unsaturated carboxylic acid esters such as methyl acrylate, n-butyl acrylate, 2-ethylhexyl acrylate, trifluoroethyl acrylate, and methyl methacrylate; $\alpha,\beta$-ethylenically unsaturated carboxylic acid amides such as acrylamide and methacrylamide; vinyl aromatic compounds such as styrene, $\alpha$-methylstyrene, p-methylstyrene, and divinylbenzene; vinyl esters of carboxylic acids, such as vinyl acetate and vinyl propionate; vinyl ether compounds such as fluoroethyl vinyl ether; and the like.

Specific examples of the conjugated diene-based polymer used in the present invention include a butadiene polymer, an isoprene polymer, a butadiene-styrene copolymer, an acrylonitrile-butadiene copolymer, an acrylonitrile-isoprene copolymer, an acrylonitrile-butadiene-isoprene copolymer, a methacrylonitrile-butadiene copolymer, a methacrylonitrile-isoprene copolymer, a methacrylonitrile-butadiene-isoprene copolymer, an acrylonitrile-methacrylonitrile-butadiene copolymer, an acrylonitrile-butadiene-methyl acrylate copolymer, an acrylonitrile-butadiene-acrylic acid copolymer, an acrylonitrile-butadiene-acrylic acid ester copolymer, and the like.

Among the above conjugated diene-based polymers, from the viewpoint of practicality and versatility as a production raw material of the hydrogenated, conjugated diene-based polymer, an acrylonitrile-butadiene copolymer, a methacrylonitrile-butadiene copolymer, and an acrylonitrile-butadiene-acrylic acid ester copolymer are preferable, and an acrylonitrile-butadiene copolymer is more preferable.

The compositional ratio of monomer units constituting the conjugated diene-based polymer is not particularly limited, and preferably, the conjugated diene monomer unit is 5 to 100 wt % and the unit of a monomer copolymerizable therewith is 95 to 0 wt %, and more preferably, the conjugated diene monomer unit is 10 to 90 wt % and the unit of a monomer copolymerizable therewith is 90 to 10 wt %. The weight average molecular weight (a gel permeation chromatography method, in terms of standard polystyrene) of the conjugated diene-based polymer is also not particularly limited, and is usually 5,000 to 500,000.

In the emulsion polymerization method as a suitable method for preparing a conjugated diene-based polymer, polymerization is generally carried out in an aqueous medium using a radical polymerization initiator, and in the emulsion polymerization method, a known polymerization initiator and molecular weight modifier may be used. The polymerization reaction may be batch-wise, semibatch-wise, or continuous, and the polymerization temperature and the pressure are also not particularly limited. The emulsifier to be used is also not particularly limited, and an anionic surfactant, a cationic surfactant, an amphoteric surfactant, a nonionic surfactant, and the like can be used, and an anionic surfactant is preferable. These emulsifiers may be used singly or in combinations of two or more. The amount thereof used is not particularly limited.

The solids concentration of the conjugated diene-based polymer latex obtained by emulsion polymerization is not particularly limited, and is usually 2 to 70 wt % and preferably 5 to 60 wt %. The solids concentration thereof can be suitably regulated by a known method such as a blending method, a dilution method, or a concentration method.

The hydrogenation reaction of the conjugated diene-based polymer may be carried out on the latex obtained by emulsion polymerization while the polymer is in a latex state, or may be carried out in a state of a polymer solution after the latex obtained by emulsion polymerization is coagulated and dried and then the obtained conjugated diene-based polymer is dissolved in an appropriate organic solvent.

Coagulation and drying of the latex may be carried out by a known method, and it is preferable to provide a treatment step of contacting crumbs obtained by coagulation with a basic aqueous solution to thereby modify such that the pH of a polymer solution measured when the obtained conjugated diene-based polymer is dissolved in tetrahydrofuran (THF) exceeds 7. The pH of the solution measured when the polymer solution is dissolved in THF is preferably in the range of 7.2 to 12, more preferably 7.5 to 11.5, and most preferably 8 to 11. This contact treatment of crumbs and a basic aqueous solution enables hydrogenation of a solution system to promptly proceed.

The solution concentration of the conjugated diene-based polymer in the polymer solution is preferably 1 to 70 wt % and more preferably 2 to 40 wt %. Examples of the organic solvent include aliphatic hydrocarbons such as n-hexane, cyclohexane, and n-heptane; aromatic hydrocarbons such as benzene, toluene, xylene, and chlorobenzene; ketones such as acetone, methyl ethyl ketone, diethyl ketone, methyl isopropyl ketone, 2-pentanone, 3-pentanone, cyclopentanone, and cyclohexanone; ethers such as diethyl ether, tetrahydrofuran, dioxane, and anisole; esters such as ethyl acetate; and the like. Among these organic solvents, ketones are preferably used, and acetone is particularly suitably used.

In the case of carrying out a hydrogenation reaction in a latex state as-is, the hydrogenation reaction may be carried out by mixing the latex of the polymer and the dispersion of metal-containing particles obtained by the above-described production method and stirring the mixture in a hydrogen gas atmosphere, and in the case of carrying out a hydrogenation reaction in a polymer solution state, the hydrogenation reaction may be carried out by mixing the polymer solution and the dispersion of metal-containing particles obtained by the above-described production method and stirring the mixture in a hydrogen gas atmosphere.

The temperature of the hydrogenation reaction is usually 0 to 200° C., preferably 5 to 150° C., and more preferably 10 to 100° C. Configuring the temperature of the hydrogenation reaction to be in the above range enables a sufficient reaction rate to be obtained while suppressing side reactions.

The pressure of hydrogen when carrying out the hydrogenation reaction is usually 0.1 to 20 MPa, preferably 0.1 to 15 MPa, and more preferably 0.1 to 10 MPa as a gauge pressure. The reaction time is not particularly limited, and is usually 30 minutes to 50 hours. As for hydrogen gas, the reaction system is preferably first purged with an inert gas such as nitrogen, further purged with hydrogen, and then pressurized.

The amount of the dispersion of metal-containing particles used when carrying out the hydrogenation reaction is preferably an amount such that the amount of metal in the metal-containing particles contained in the dispersion of metal-containing particles (i.e., the amount of metal in metal particles and metal compound particles derived from the metal-supported material) is 10 to 3,000 wt ppm and more preferably 50 to 2,000 wt ppm per 100 wt % of the conjugated diene-based polymer used in hydrogenation. In particular, the dispersion of metal-containing particles obtained by the production method of the present invention has excellent catalytic activity as a hydrogenation reaction catalyst and can achieve a high hydrogenation reaction ratio even when used in a small amount and, therefore, from such a viewpoint, the amount of the dispersion of metal-containing particles used is preferably in the above range.

The dispersion of metal-containing particles obtained by the production method of the present invention can achieve high catalytic activity when used as a hydrogenation catalyst for a conjugated diene-based polymer as described above, and can also achieve high catalytic activity in hydrogenation reactions of carbon-carbon unsaturated bonds and the like contained in other various compounds. Specifically, high catalytic activity can also be achieved in hydrogenation reactions of, for example, olefins such as butene, pentene, hexene, methylcyclohexene, and dimethylcyclohexene; acetylene; aldehydes and ketones such as benzaldehyde, cyclopentanone, isobutyl methyl ketone, cyclohexanone, and cyclopentanone; nitriles such as benzonitrile and aminonitrile; and the like.

EXAMPLES

Below, the present invention will now be described by way of more detailed Examples, but the present invention is not limited to the Examples. The "part" below is based on weight unless specified otherwise. Tests and evaluations were performed as follows.

Hydrogenation Ratio (a)

The iodine value of an acrylonitrile-butadiene copolymer before hydrogenation and the iodine value of an acrylonitrile-butadiene copolymer after hydrogenation were measured, and the hydrogenation ratio (a) was determined from their proportions. The iodine value was measured in accordance with JIS K 6235.

Hydrogenation Ratio (b)

The amounts of 1,2-dimethyl-1-cyclohexene and 1,2-dimethyl-1-cyclohexane were measured by gas chromatography, and the hydrogenation ratio (b) was determined from their proportions.

Specifically, with a gas chromatography apparatus equipped with an FID detector (manufactured by Agilent Technologies), heating was started using HP-1 (60 m×250 µm×1.0 µm) as a capillary column under conditions having sample injection volume: 1.0 µL, split ratio: 1/50, inlet temperature: 140° C., detector temperature: 300° C., carrier gas: helium, carrier gas flow rate: 1.0 ml/min, and oven temperature: 40° C., and the temperature was retained at 40° C. for 10 minutes, then increased to 250° C. at a rate of 10° C./min, and further increased to 280° C. at a rate of 20° C./min. The proportions were determined from the area ratio in the obtained analysis result.

Production Example 1

Figure 1:
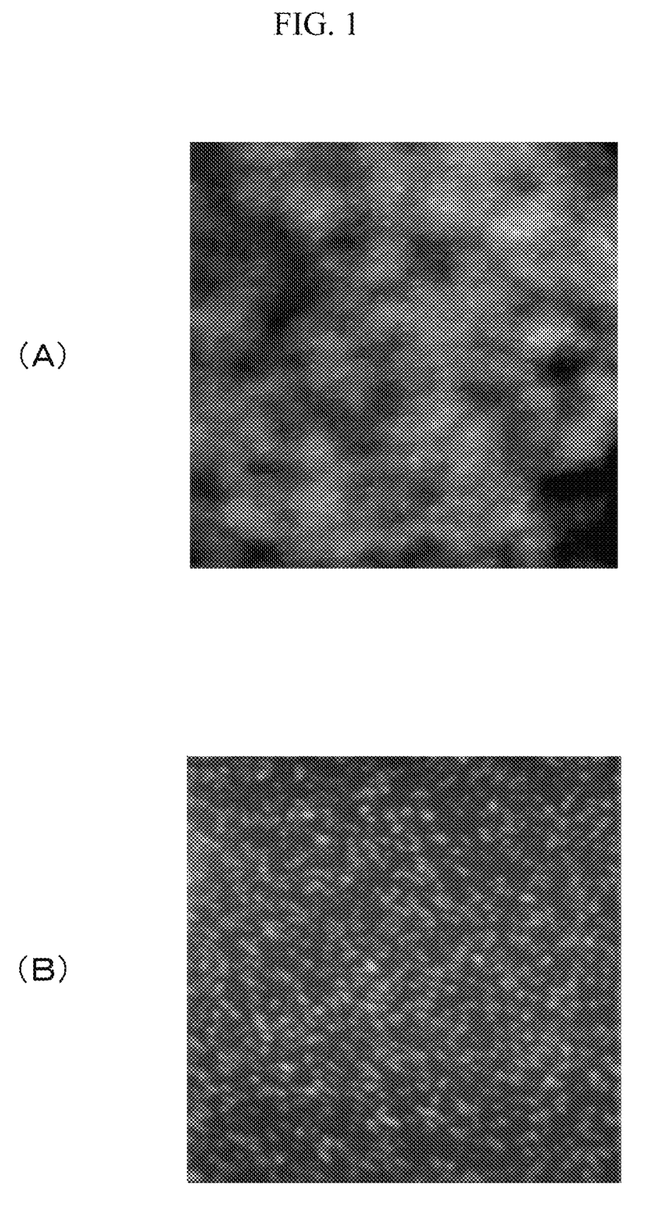
FIG. 1(A) is a transmission electron micrograph (a TEM image) of a metal-supported material obtained in Production Example 1.
FIG. 1(B) is a transmission electron micrograph (a TEM image) of a dispersion (a nano-colloidal solution) of metal-containing particles obtained in Example 1.

3.3 g of palladium(II) chloride ($PdCl_2$) was dissolved in 250 g of a 1 wt % hydrochloric acid aqueous solution. Then, 98 g of silica was added to the solution, the mixture was left to stand still overnight (about 12 hours), and then water was evaporated by an evaporator to obtain powder. The obtained powder was calcined at 400° C. for 30 minutes to obtain a metal-supported material $PdO/SiO_2$ in which palladium oxide was supported on silica. The amount of palladium supported in the obtained metal-supported material $PdO/SiO_2$ was 2 wt %. FIG. 1(A) shows a transmission electron micrograph (a TEM image) of the metal-supported material $PdO/SiO_2$ obtained in Production Example 1.

Production Example 2

The metal-supported material $PdO/SiO_2$ obtained in Production Example 1 was subjected to a reduction treatment in a hydrogen atmosphere at 300° C. for 1 hour to reduce palladium oxide supported on silica, and thus a metal-supported material $Pd/SiO_2$ in which palladium was supported on silica was obtained. The amount of palladium supported in the obtained metal-supported material $Pd/SiO_2$ was 2 wt %.

Production Example 3

A metal-supported material $PdO/Al_2O_3$ in which palladium oxide was supported on alumina was obtained in the same manner as in Production Example 1 except that 98 g of alumina was used in place of 98 g of silica. Then, the obtained metal-supported material $PdO/Al_2O_3$ was subjected to a reduction treatment in the same manner as in Production Example 2, and thus a metal-supported material $Pd/Al_2O_3$ in which palladium was supported on alumina was obtained. The amount of palladium supported in the obtained metal-supported material $Pd/SiO_2$ was 2 wt %.

Production Example 4

A metal-supported material PtO/C in which platinum oxide was supported on carbon was obtained in the same manner as in Production Example 1 except that 5.3 g of hexachloroplatinic(IV) acid hexahydrate ($H_2PtCl_6 \cdot 6H_2O$) was used in place of 3.3 g of palladium(II) chloride ($PdCl_2$), and 98 g of carbon was used in place of 98 g of silica. Then, the obtained metal-supported material PtO/C was subjected to a reduction treatment in the same manner as in Production Example 2, and thus a metal-supported material Pt/C in which platinum was supported on carbon was obtained. The amount of platinum supported in the obtained metal-supported material Pt/C was 2 wt %.

Production Example 5

A reactor was charged with 2 parts of potassium oleate, 180 parts of ion-exchanged water, 37 parts of acrylonitrile, and 0.5 parts of t-dodecyl mercaptan in this order. After the reactor was nitrogen-purged, 63 parts of butadiene was added, the reactor was cooled to 10° C., and 0.01 parts of cumene hydroperoxide and 0.01 parts of ferrous sulfate were added. The contents were stirred for 16 hours while retaining the reactor at 10° C. After an aqueous solution of 10 wt % of hydroquinone was added to the reactor to terminate the polymerization reaction, unreacted monomers were removed from the polymerization reaction solution, the solids concentration was adjusted to 30 wt %, and thus an acrylonitrile-butadiene copolymer latex was obtained. The polymerization conversion ratio in the polymerization reaction was 90%. The obtained acrylonitrile-butadiene copolymer latex had a copolymer composition of 37 wt % of an acrylonitrile unit and 63 wt % of a butadiene unit.

Example 1

To a 100 ml stainless-steel pressure vessel, 0.2 g of the metal-supported material $PdO/SiO_2$ obtained in Production Example 1 and 2 g of an aqueous solution of 30 wt % of polyvinylpyrrolidone (PVP, weight average molecular weight in terms of polystyrene: 10,000) were added, and then water was added such that the total amount of the solution was 20 g. The palladium concentration in the solution at this time was 0.020 wt %, and the weight ratio of "polyvinylpyrrolidone/palladium" was 150. Then, the 100 ml stainless-steel pressure vessel was filled with hydrogen and pressurized with hydrogen to 1 MPa (a gauge pressure), and the pressurized stainless-steel pressure vessel was secured to a rotator provided in a thermostat that was set at a temperature of 20° C., and rotated at a rotational speed of 36 rpm for 1 hour to stir the inside of the stainless-steel pressure vessel. Then, the stirred solution was subjected to filtration to recover the metal-supported material, and thus a nano-colloidal solution (a1) was obtained.

Concerning the obtained nano-colloidal solution (a1), the palladium concentration was measured by atomic absorptiometry, resulting in a palladium concentration of 0.016 wt % in the nano-colloidal solution (a1). FIG. 1(B) shows a transmission electron micrograph (a TEM image) of the nano-colloidal solution (a1) obtained in Example 1. As for this transmission electron micrograph (a TEM image), the nano-colloidal solution (a1) obtained in Example 1 was measured in a coagulated state, and the image shown in FIG. 1(B) was taken at the same magnification as the image shown in FIG. 1(A). It can be deemed from a comparison of FIG. 1(A) and FIG. 1(B) that the particles of palladium oxide supported on the surface of the metal-supported material obtained in Production Example 1 and the particles of palladium oxide in the nano-colloidal solution (a1) obtained in Example 1 have nearly the same size, and accordingly the particles of palladium oxide supported on the surface of the metal-supported material obtained in Production Example 1 are uniformly dispersed in the nano-colloidal solution (a1) obtained in Example 1 while retaining the particle size thereof (the same also applies to Examples 2 to 7 described below). That is, it can be deemed that in the nano-colloidal solution (a1), palladium oxide (PdO) particles in the order of nanometers are uniformly dispersed in water.

Then, 400 parts of the acrylonitrile-butadiene copolymer latex obtained in Production Example 5 (120 parts in terms of solids) and the nano-colloidal solution (a1) obtained above were introduced into an autoclave equipped with a stirrer in an amount such that the amount of palladium metal in the nano-colloidal solution (a1) was 700 wt ppm per 100 wt % of the acrylonitrile-butadiene copolymer, and nitrogen gas was allowed to flow for 10 minutes to remove dissolved oxygen in the latex. The system was purged with hydrogen gas twice, and then pressurized with 3 MPa of hydrogen. The contents were heated to 50° C. and stirred for 6 hours to carry out a hydrogenation reaction, and thus a latex of a hydrogenated acrylonitrile-butadiene copolymer (b1) was obtained. The obtained hydrogenated acrylonitrile-butadiene copolymer (b1) was concentrated under reduced pressure by a rotary evaporator, and thus the hydrogenated acrylonitrile-butadiene copolymer (b1) in a solid foam was obtained. When the hydrogenation ratio of the obtained hydrogenated acrylonitrile-butadiene copolymer (b1) was measured by the above method, the hydrogenation ratio was 93%.

Example 2

A nano-colloidal solution (a2) in which palladium oxide (PdO) particles in the order of nanometers were uniformly dispersed in water was obtained in the same manner as in Example 1 except that the amount of an aqueous solution of 30 wt % of polyvinylpyrrolidone (PVP) was changed from 2 g to 8 g (i.e., the weight ratio of "polyvinylpyrrolidone/palladium" was 600), and the temperature of the thermostat when the pressurized stainless-steel pressure vessel was rotated for stirring was changed from 20° C. to 50° C. The palladium concentration in the obtained nano-colloidal solution (a2) was 0.019 wt %.

Then, a hydrogenation reaction of the acrylonitrile-butadiene copolymer latex obtained in Production Example 5 was carried out in the same manner as in Example 1 except that the nano-colloidal solution (a2) obtained above was used, and thus a hydrogenated acrylonitrile-butadiene copolymer (b2) was obtained. The hydrogenation ratio of the obtained hydrogenated acrylonitrile-butadiene copolymer (b2) was 95%.

Example 3

A nano-colloidal solution (a3) in which palladium particles in the order of nanometers were uniformly dispersed in water was obtained in the same manner as in Example 1 except that 0.2 g of the metal-supported material Pd/SiO$_2$ obtained in Production Example 2 was used in place of 0.2 g of the metal-supported material PdO/SiO$_2$ obtained in Production Example 1, and the stainless-steel pressure vessel was not filled with hydrogen. The palladium concentration in the obtained nano-colloidal solution (a3) was 0.004 wt %.

Then, a hydrogenation reaction of the acrylonitrile-butadiene copolymer latex obtained in Production Example 5 was carried out in the same manner as in Example 1 except that the nano-colloidal solution (a3) obtained above was used, and thus a hydrogenated acrylonitrile-butadiene copolymer (b3) was obtained. The hydrogenation ratio of the obtained hydrogenated acrylonitrile-butadiene copolymer (b3) was 90%.

Example 4

A nano-colloidal solution (a4) in which palladium particles in the order of nanometers were uniformly dispersed in water was obtained in the same manner as in Example 1 except that 0.2 g of the metal-supported material Pd/Al$_2$O$_3$ obtained in Production Example 3 was used in place of 0.2 g of the metal-supported material PdO/SiO$_2$ obtained in Production Example 1, and 2 g of an aqueous solution of 30 wt % of polymethyl vinyl ether (PMVE) was used in place of 2 g of an aqueous solution of 30 wt % of polyvinylpyrrolidone (PVP). The palladium concentration in the obtained nano-colloidal solution (a4) was 0.012 wt %.

Then, a hydrogenation reaction of the acrylonitrile-butadiene copolymer latex obtained in Production Example 5 was carried out in the same manner as in Example 1 except that the nano-colloidal solution (a4) obtained above was used, and thus a hydrogenated acrylonitrile-butadiene copolymer (b4) was obtained. The hydrogenation ratio of the obtained hydrogenated acrylonitrile-butadiene copolymer (b4) was 88%.

Example 5

A nano-colloidal solution (a5) in which palladium particles in the order of nanometers were uniformly dispersed in methanol was obtained in the same manner as in Example 1 except that 2 g of an aqueous solution of 30 wt % of polyethylene glycol (PEG) was used in place of 2 g of an aqueous solution of 30 wt % of polyvinylpyrrolidone (PVP), and methanol was used in place of water as a solvent. The palladium concentration in the obtained nano-colloidal solution (a5) was 0.014 wt %.

Then, a hydrogenation reaction of the acrylonitrile-butadiene copolymer latex obtained in Production Example 5 was carried out in the same manner as in Example 1 except that the nano-colloidal solution (a5) obtained above was used, and thus a hydrogenated acrylonitrile-butadiene copolymer (b5) was obtained. The hydrogenation ratio of the obtained hydrogenated acrylonitrile-butadiene copolymer (b5) was 85%.

Example 6

A nano-colloidal solution (a6) in which palladium oxide (PdO) particles in the order of nanometers were uniformly dispersed in water was obtained in the same manner as in Example 1 except that instead of filling the stainless-steel pressure vessel with hydrogen, sodium borohydride (NaBH$_4$) was added. The palladium concentration in the obtained nano-colloidal solution (a6) was 0.014 wt %.

Then, a hydrogenation reaction of the acrylonitrile-butadiene copolymer latex obtained in Production Example 5 was carried out in the same manner as in Example 1 except that the nano-colloidal solution (a6) obtained above was used, and thus a hydrogenated acrylonitrile-butadiene copolymer (b6) was obtained. The hydrogenation ratio of the obtained hydrogenated acrylonitrile-butadiene copolymer (b6) was 85%.

Example 7

A nano-colloidal solution (a7) in which platinum particles in the order of nanometers were uniformly dispersed in water was obtained in the same manner as in Example 1 except that 0.2 g of the metal-supported material Pt/C obtained in Production Example 4 was used in place of 0.2 g of the metal-supported material PdO/SiO$_2$ obtained in Production Example 1, and the amount of an aqueous solution of 30 wt % of polyvinylpyrrolidone (PVP) used was changed from 2 g to 0.133 g (i.e., the weight ratio of "polyvinylpyrrolidone/platinum" was 10). The platinum concentration in the obtained nano-colloidal solution (a7) was 0.008 wt %.

Then, an acetone solution in which 1,2-dimethyl-1-cyclohexene was dissolved in an amount of 5 wt % and the nano-colloidal solution (a7) obtained above were introduced into an autoclave equipped with a stirrer in amounts such that the amount of platinum metal in the nano-colloidal solution (a7) was 100 wt ppm per 100 wt % of 1,2-dimethyl-1-cyclohexene, and nitrogen gas was allowed to flow for 10 minutes to remove dissolved oxygen in the acetone solution. The system was purged with hydrogen gas twice, and then pressurized with 0.3 MPa of hydrogen. The contents were heated to 30° C. and stirred for 6 hours to carry out a hydrogenation reaction, and thus a hydrogenate was obtained. The hydrogenation ratio was measured by gas chromatography, and the hydrogenation ratio was 99%.

Comparative Example 1

To a 100 ml flask, 0.016 g of palladium acetate and 4 g of an aqueous solution of 30 wt % of polyvinylpyrrolidone (PVP) were added, and then a solution of water/methanol=1/9 (weight ratio) was added such that the total amount of the solution was 40 g. At this time, the palladium concentration in the solution was 0.020 wt %, and the weight ratio of "polyvinylpyrrolidone/palladium" was 150. Then, reflux was carried out at 90° C. for 2 hours in a N$_2$ stream to obtain a colloidal solution (a8). The palladium concentration in the obtained colloidal solution (a8) was 0.020 wt %. From observation of the obtained colloidal solution (a8) under a transmission electron microscope (TEM), although it was possible to confirm the presence of palladium particles in the colloidal solution (a8), the palladium particles were present as coarse particles and unevenly present in the colloidal solution (a8).

Then, a hydrogenation reaction of the acrylonitrile-butadiene copolymer latex obtained in Production Example 5 was carried out in the same manner as in Example 1 except that the nano-colloidal solution (a8) obtained above was used, and thus a hydrogenated acrylonitrile-butadiene copolymer (b8) was obtained. The hydrogenation ratio of the obtained hydrogenated acrylonitrile-butadiene copolymer (b8) was 40%.

TABLE 1

| | | Example 1 | Example 2 | Example 3 | Example 4 | Example 5 | Example 6 | Example 7 | Comparative Example 1 |
|---|---|---|---|---|---|---|---|---|---|
| Dispersion of metal-containing particles | | | | | | | | | |
| Catalyst species as raw material | | PdO/SiO$_2$-supported material | PdO/SiO$_2$-supported material | Pd/SiO$_2$-supported material | Pd/Al$_2$O$_3$-supported material | PdO/SiO$_2$-supported material | PdO/SiO$_2$-supported material | Pt/C-supported material | Palladium acetate |
| Solvent | | Water | Water | Water | Water | Methanol | Water | Water | Water/Methanol |
| Polymeric protective agent | | PVP | PVP | PVP | PMVE | PEG | PVP | PVP | PVP |
| Weight ratio of polymeric protective agent/metal in catalyst | | 150 | 600 | 150 | 150 | 150 | 150 | 10 | 150 |
| Stirring temperature | (° C.) | 20 | 50 | 20 | 20 | 20 | 20 | 20 | 90° C. reflux |
| Reducing agent used when stirring | | H$_2$ | H$_2$ | None | H$_2$ | H$_2$ | NaBH$_4$ | H$_2$ | Methanol |
| Metal concentration in dispersion | (wt %) | 0.016 | 0.019 | 0.004 | 0.012 | 0.014 | 0.014 | 0.008 | 0.020 |
| Hydrogenation reaction | | | | | | | | | |
| Metal concentration in dispersion per 100 wt % of substrate | (wt ppm) | 700 | 700 | 700 | 700 | 700 | 700 | 100 | 700 |
| Hydrogenation ratio (a) | (%) | 93 | 95 | 90 | 88 | 85 | 85 | | 40 |
| Hydrogenation ratio (b) | (%) | | | | | | | 99 | |

The results of Examples 1 to 7 and Comparative Example 1 are collectively shown in Table 1. As shown in Table 1, in all cases where a dispersion (a nano-colloidal solution) of metal-containing particles obtained by contacting a polymeric protective agent with a metal-supported material was used as a hydrogenation catalyst, it was possible to achieve a high hydrogenation ratio (Examples 1 to 7). On the other hand, in a case where palladium acetate, which is a metal salt, was used in place of a metal-supported material, a polymeric protective agent was added thereto, the mixture was refluxed at 90° C., and the obtained colloidal solution was used as a hydrogenation catalyst, the resulting hydrogenation ratio was as low as 40% (Comparative Example 1).

The invention claimed is:

1. A method for producing a hydrogenated, conjugated diene-based polymer, comprising
    obtaining a dispersion of metal-containing particles by (1) supporting a metal and/or a metal compound on a carrier to form a metal-supported material, and (2) subsequently contacting the metal-supported material with a polymeric protective agent showing affinity for the metal and/or the metal compound in a solvent wherein in the dispersion of metal-containing particles, the metal and/or the metal compound is dispersed in the solvent in the form of particles, and
    hydrogenating a conjugated diene-based polymer in a solvent in the presence of the dispersion of metal-containing particles, wherein
    an atmosphere when contacting the metal-supported material with the polymeric protective agent in the solvent is a hydrogen gas atmosphere with a gauge pressure of hydrogen of 0.01 to 5 MPa.

2. The method for producing a hydrogenated, conjugated diene-based polymer according to claim 1, wherein the metal and/or the metal compound is a platinum group element and/or a platinum group element-containing compound.

3. The method for producing a hydrogenated, conjugated diene-based polymer according to claim 1, wherein the polymeric protective agent is a polymer of a vinyl compound having a polar group on a side chain.

4. The method for producing a hydrogenated, conjugated diene-based polymer according to claim 3, wherein the polymeric protective agent is polyvinylpyrrolidone.

5. The method for producing a hydrogenated, conjugated diene-based polymer according to claim 1, wherein a ratio of the polymeric protective agent to the metal-supported material is 0.1 to 1,000 in terms of a weight ratio of the polymeric protective agent/a sum of the metal and the metal compound in the metal-supported material.

* * * * *